Jan. 14, 1936.   M. A. HUNT   2,027,824
COUPLING
Filed April 19, 1934
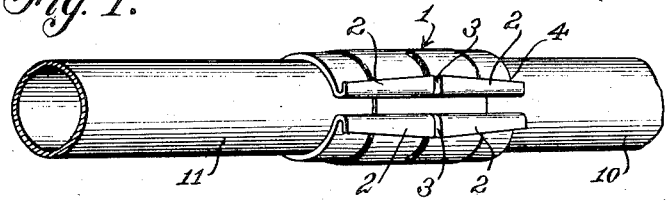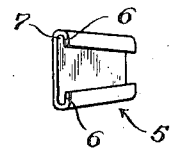
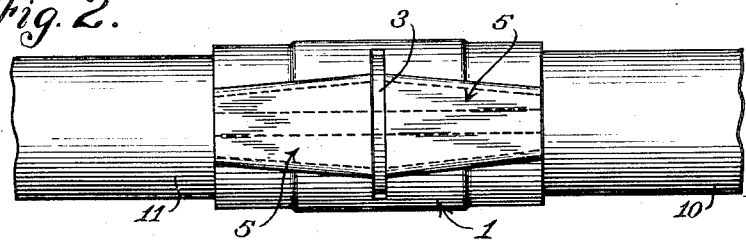
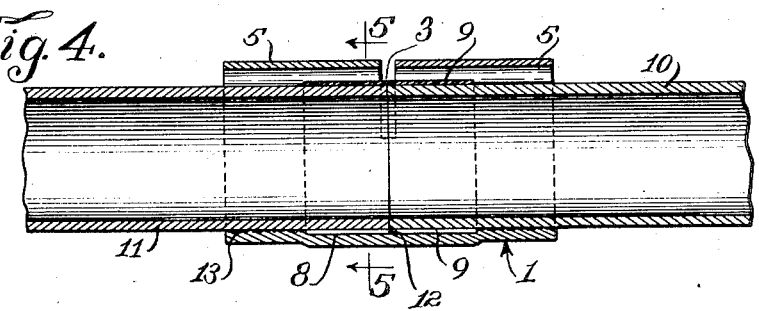
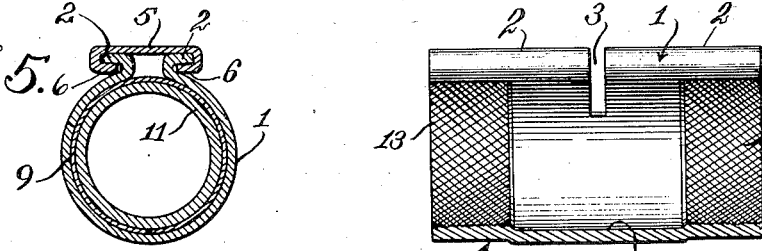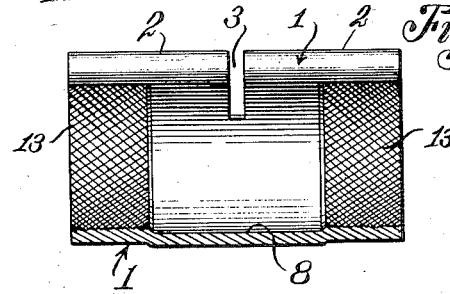
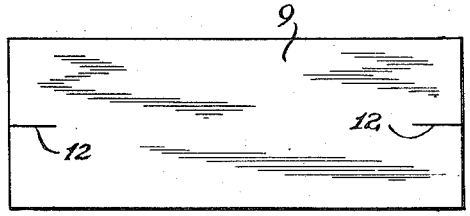
Inventor;
Martin A. Hunt
By Jones, Addington, Ames & Seibold,
Attys.

Patented Jan. 14, 1936

2,027,824

UNITED STATES PATENT OFFICE 2,027,824

COUPLING

Martin A. Hunt, Chicago, Ill.

Application April 19, 1934, Serial No. 721,261

4 Claims. (Cl. 285—194)

This invention relates to couplings and more particularly to couplings for rigidly connecting the adjacent ends of pipes, rods, or conduits and the like. This invention is especially adapted for use for coupling conduits such as commonly used for electrical conductors, or for any purpose wherein it is desirable that the conduits be rigidly connected in a manner whereby the entire system may be easily grounded.

While the embodiment herein illustrated is shown and described in connection with the usual type of electrical conduit, it will be understood that the invention is equally well adapted for coupling any cylindrical members such as rods or pipes and particularly such members having plain unthreaded ends. In the usual type of coupling it has been common practice to either thread the ends of the conduits and tap the coupling therefor, or to thread and tap parts of the coupling in such a manner that the associated members may be screwed together in a manner to rigidly secure the conduits.

It is an object of the present invention to provide a simple and efficient threadless coupling in which all threads, either on the conduit or on the coupling, are entirely eliminated and whereby the conduit joint may be completely enclosed and the coupling quickly and easily secured in place by the use of a hammer only.

The present invention provides a coupling, which is of few parts, cheap to manufacture and convenient in use. All threading and tapping are entirely eliminated and therefore the entire device may be manufactured from sheet metal by means of a punch press and all so-called machine work eliminated.

Further objects will be apparent from the specification and the appended claims.

In the drawing:

Figure 1 is a perspective view of one embodiment of the invention as applied to conduits and before the clamping members are applied thereto.

Fig. 2 is a top plan view of the complete coupling clamped on the conduits.

Fig. 3 is a perspective view of one of the clamping members.

Fig. 4 is a longitudinal section.

Fig. 5 is a transverse section taken on a line corresponding to line 5—5 of Fig. 4.

Fig. 6 is a longitudinal section taken through the main coupling sleeve only and on a line substantially corresponding to line 4—4 of Fig. 2.

Fig. 7 is a top view of a blank from which the lining or packing used in the coupling may be formed.

Referring to the drawing in detail, the embodiment illustrated comprises a cylindrical open-end sleeve or coupling member 1 which is preferably made of comparatively thin sheet metal and split longitudinally as illustrated in Fig. 1. The longitudinal edges are provided with out-turned flanges 2 which are transversely slotted at 3 and these slots preferably extend downwardly into the body portion of the sleeve as shown, whereby the adjacent oppositely disposed flanges may be independently operated by suitable clamping means to clamp snugly onto one end of a conduit while leaving the opposite end of the sleeve sufficiently open to receive the end of another conduit to be coupled thereto.

The out-turned flanges 2 are provided with oppositely disposed cam surfaces 4 and these flanges and cam surfaces thereon form a double end wedge-like structure tapering toward opposite ends of the sleeve, whereby suitable clamping members may be forced thereon to snugly clamp the sleeve to the adjacent conduit ends.

Interchangeable clamping members or sockets 5 are provided and are preferably tapered, as illustrated, to conform to the wedge-like sleeve members and are provided with inturned flanges 6 forming grooves or slots 7 for engaging around the out-turned sleeve flanges 2. After the sleeve has been assembled on the ends of the conduits as illustrated in Fig. 1, the clamping members 5, which in the embodiment illustrated form sockets to receive the tapered flanges 2, may be forced over the out-turned flanges 2 substantially to the position illustrated in Fig. 2, whereby the sleeve 1 will be rigidly clamped to the conduits, and the conduits will be rigidly secured together thereby.

In order that the joint between the conduits may be completely covered and made substantially waterproof, the central portion of the coupling member is preferably formed to provide a wide lateral groove 8 to receive a suitable packing or lining member 9 which may be a thin sheet of metal or other suitable material formed into a split sleeve and inserted in the lateral groove with the split or open side opposite the open side of the sleeve 1. The thickness of the material of the lining 9 is preferably the same as the depth of the groove 8 whereby the lining 9 and sleeve 1 may be simultaneously clamped on the ends of suitable conduits 10 and 11 when they are inserted therein.

The blank from which the lining 9 may be formed is illustrated in Fig. 7 and it is preferably sheared or slotted at its ends as indicated at 12. The lining 9 may be formed into a cylindrical shape as illustrated particularly in Fig. 5, and inserted in the sleeve 1 with the open side at the bottom as shown. The slots 12 will then be substantially on the transverse center line of the coupling. The slots 12 are for the purpose of allowing expansion of one end of the lining 9 in its seat 8 in the unclamped end of the sleeve 1 even though the opposite end is clamped snugly to a conduit. By means of these slots, the end of the other conduit may then be easily inserted in the coupling and also clamped in place.

In assembling the coupling on conduits or other members, the sleeve 1 and lining 9 therein are first placed over the end of one conduit with the lining in the position illustrated, and one of the clamping members 5 is then driven onto the out-turned flanges 2 of the sleeve 1 and adjacent the end of the conduit, and that end of the conduit including the associated portion of the lining or packing 9 will be securely clamped in the sleeve 1. The end of the other conduit may then be inserted in the other end of the coupling and another clamping member 5 is securely driven in position on the flanges 2 thereby rigidly securing the conduits together.

The inner surfaces 13 of the ends of the sleeve 1 may be knurled or otherwise roughened, or, if desired, a suitable cement may be applied thereto in order to prevent slipping of the coupling after it is assembled on the conduits. While the sleeve 1 and all associated parts are preferably made of thin sheet metal, they may be constructed of any suitable material. The sheet metal construction presents many advantages in that the parts may be very easily formed and they are sufficiently resilient to allow easy insertion of the conduit ends and to provide efficient clamping action.

The lining or packing 9 is preferably of comparatively thin material and may be cylindrically formed or may be merely a flat blank such as shown in Fig. 7, if desired, and the user may wrap it around the conduit to form it in a generally cylindrical shape and it may then be inserted in the sleeve 1 and the coupling then placed over the ends of the conduits. For some purposes it may be desirable to make the lining 9 of slightly compressible material.

The construction herein illustrated and described is particularly desirable in that no so-called machine finishing is required on any of the parts, and, as there are no threaded parts, the device may be substantially entirely manufactured on a punch press and may be quickly applied to conduits or the like with a few strokes of a hammer.

Modifications in detail may be made by those skilled in the art and it is desired, therefore, that the invention be limited only by the prior art and the scope of the appended claims.

Having thus described the invention, what is claimed and desired to be secured by Letters Patent is:

1. A coupling of the character described comprising a sheet metal member formed to provide a sleeve to receive the abutting ends of conduits or the like therein and having the transverse ends of said member formed to provide outwardly extending flanges, said flanges being wider at the transverse center of said sleeve than at the ends, at least one of said flanges being slotted adjacent the transverse center of said sleeve, a centrally disposed lateral groove in said sleeve and forming a circumferential seat therein, a longitudinally split lining substantially filling said seat and having its open side remote from the open side of said sleeve, the exposed inner surface of said sleeve being roughened for engagement with a conduit when clamped thereon, and tapered sheet metal clamping members having inturned side flanges arranged to engage said sleeve flanges to clamp each respective end of said sleeve on its respective conduit end when the clamping members are driven longitudinally onto said flanges from opposite ends of said sleeve said split lining being arranged to permit independent insertion of conduit ends therein and independent clamping thereon.

2. A conduit coupling comprising a single sheet metal blank formed to provide a longitudinally split sleeve having outturned flanges adjacent the split, said sleeve being transversely slotted through said flanges sufficiently to allow individual clamping of one end on a conduit and to allow the insertion of a conduit in the other end, said flanges tapering from said slot outwardly, sheet metal wedge plates formed to engage around said flanges and conforming in taper thereto, said sleeve having a centrally disposed relatively wide lateral packing pocket formed therein, a sheet packing member in said pocket and arranged to completely enclose the conduit ends inserted therein, said packing being sufficiently expansible to be retained in said pocket in a manner to allow insertion of conduits therein from either end and to allow the insertion of a conduit in one end after the opposite end of said sleeve and said packing has been clamped on a conduit.

3. A conduit coupling comprising a single sheet metal blank formed to provide a longitudinally split sleeve having outturned flanges adjacent the split, said sleeve being transversely slotted through said flanges sufficiently to allow individual clamping of one end on a conduit and to allow the insertion of a conduit in the other end, said flanges tapering from said slot outwardly, sheet metal wedge plates formed to engage around said flanges and conforming in taper thereto, said sleeve having a centrally disposed relatively wide lateral packing pocket formed therein, a sheet packing member in said pocket and arranged to completely enclose the conduit ends inserted therein, the ends of said packing sheet being slotted in alignment with the transverse center of said coupling and sufficiently resilient whereby the packing will be retained in said pocket in a manner to allow insertion of conduits therein from either end and to allow the insertion of a conduit in one end after the opposite end of said sleeve and said packing has been clamped on a conduit.

4. In a conduit coupling of the character described, the combination of two resilient split sleeves, one of said sleeves being formed to retain the other therein in a manner to permit the insertion of conduit ends and with each sleeve closing the split of the other sleeve, and longitudinally slidable means engaging the split edges of the outer sleeve for clamping either end of said coupling on a conduit end independently of the other end of said coupling, said inner sleeve being completely closed by said clamping, whereby the joint between the conduit ends is effectively sealed.

MARTIN A. HUNT.